United States Patent [19]
Flenker et al.

[11] Patent Number: 5,878,821
[45] Date of Patent: Mar. 9, 1999

[54] TILLAGE IMPLEMENT WITH ON-THE-GO ANGLE AND DEPTH CONTROLLED DISCS

[76] Inventors: Kevin P. Flenker, 203 W. 1st St.; William Flenker, 29476 240th Ave., both of Long Grove, Iowa 52756; Kim W. Flenker, 24739 257th St., Princeton, Iowa 52768

[21] Appl. No.: 889,488

[22] Filed: Jul. 8, 1997

[51] Int. Cl.⁶ ........................................... A01B 5/00
[52] U.S. Cl. ........................ 172/569; 172/584; 172/603
[58] Field of Search ........................ 172/156, 430, 172/454, 413, 569, 574, 575, 576, 579, 580, 584, 603, 609

[56] References Cited

U.S. PATENT DOCUMENTS

| | | | |
|---|---|---|---|
| 508,028 | 11/1893 | Le'Neweber | 172/569 |
| 633,465 | 9/1899 | Mertes | 172/584 X |
| 1,026,912 | 5/1912 | Hardt | 172/569 X |
| 1,047,921 | 12/1912 | Dins | 172/569 X |
| 2,600,854 | 6/1952 | Cross | 172/603 X |
| 2,727,453 | 12/1955 | Altgelt . | |
| 3,675,725 | 7/1972 | Schultz | 172/576 X |
| 4,454,920 | 6/1984 | Dietrich, Sr. . | |
| 5,078,216 | 1/1992 | Dick . | |
| 5,207,279 | 5/1993 | Nelson et al. . | |
| 5,458,203 | 10/1995 | Evers | 172/574 X |
| 5,462,123 | 10/1995 | Harlan et al. . | |

*Primary Examiner*—Michael J. Carone
*Assistant Examiner*—Robert Pezzuto
*Attorney, Agent, or Firm*—Henderson & Sturm

[57] ABSTRACT

A tillage implement with on-the-go angle and depth controlled discs. The toolbar upon which the discs are mounted is pivotally secured to the wheeled implement frame assembly and may be hydraulically pivoted to raise or lower the discs relative to the frame assembly. In addition, the discs are secured to the toolbar in pairs and are angularly adjustable with respect to each other, and to the direction of motion of the implement, through a pair of hydraulically actuated gears.

11 Claims, 4 Drawing Sheets

TILLAGE IMPLEMENT WITH ON-THE-GO ANGLE AND DEPTH CONTROLLED DISCS

CROSS-REFERENCE TO RELATED APPLICATIONS

Not Applicable

STATEMENT REGARDING FEDERALLY SPONSORED RESEARCH OR DEVELOPEMENT

Not Applicable

BACKGROUND OF THE INVENTION

1. Field of the Invention

This invention relates to tillage implements, and more particularly to such implements in which the depth of penetration and angle of attack of the discs may be controlled on-the-go by the tractor driver.

2. Description of the Related Art

Modern tillage implements are generally comprised of a wheeled frame assembly which carries a combination of farming implements so as to accomplish several tillage tasks on each pass of the implement. One common tillage implement carries one or more gangs of discs across the forward end of the frame assembly to cut and mix residue materials into the soil and work the upper layer of the soil. The disc gangs are then followed by a several laterally spaced deep tillage or cultivating tools which work the soil at a greater depth. The deep tillage tools are often followed by a second set of discs to further mix, smooth, and level the tilled soil.

The frame assembly is supported by one or more pairs of tires which may be hydraulically raised and lowered to provide for transportation of the implement on the roadways and also to control the depth at which the tillage implements work. Modern implements utilize the vertically adjustable tires to control the working depth of the deep tillage tools and are also able to adjust the working depth of the discs by hydraulically controlling the vertical position of the disc toolbar. While it is also desirable to adjust the angle of attack of the various discs to control the amount of soil they turn, this must be done manually by changing the angular orientation of the disc toolbar with respect to the direction of travel of the implement.

BRIEF SUMMARY OF THE INVENTION

Briefly stated, the present invention discloses a tillage implement with on-the-go angle and depth controlled discs. The toolbar upon which the discs are mounted is pivotally secured to the wheeled implement frame assembly and may be hydraulically pivoted to raise or lower the discs relative to the frame assembly. In addition, the discs are secured to the toolbar in pairs and are angularly adjustable with respect to each other, and to the direction of travel of the implement, through a pair of hydraulically actuated gears.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1:
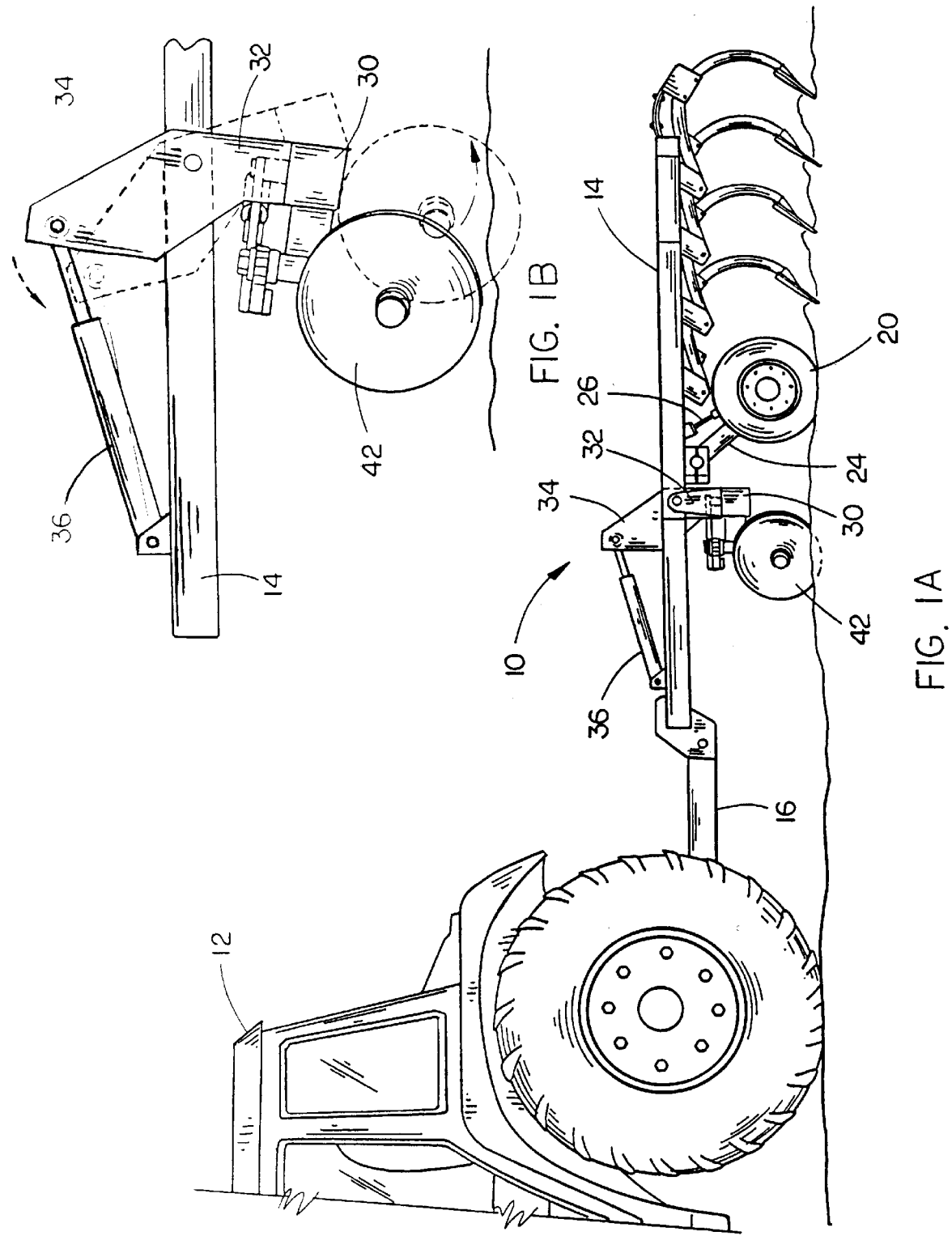
FIG. 1A is a side elevational view of the invention being towed behind a tractor in conjunction with deep tillage cultivation tools.
FIG. 1B is a side elevational view of the invention depicting the depth adjustment mechanism.
Figure 2:
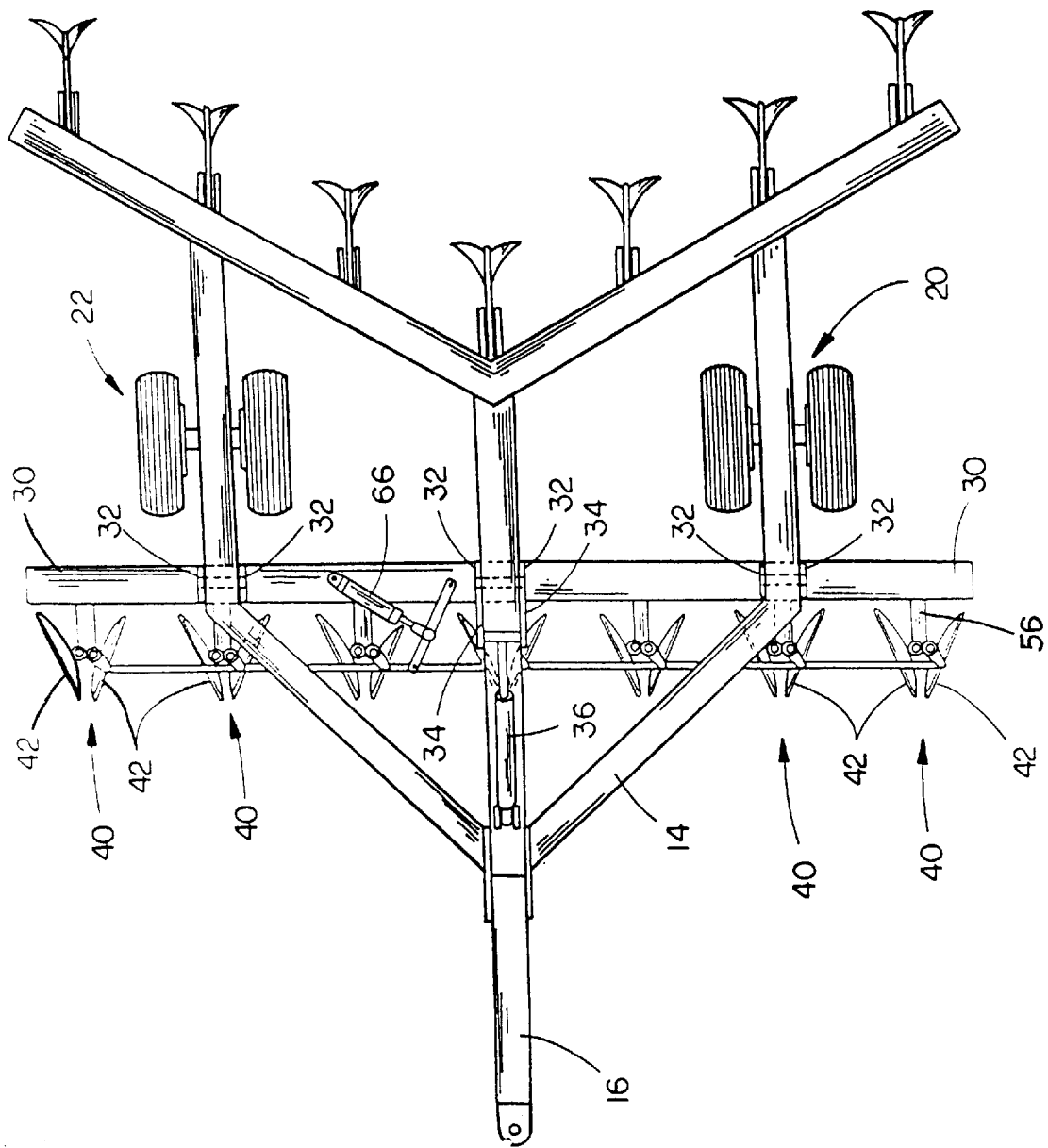
FIG. 2 is a top plan view of the invention in conjunction with deep tillage cultivation tools.

Referring now to the drawings, wherein like reference numerals designate identical or corresponding parts throughout the several views, FIG. 1A shows the invention depicted generally at 10 being towed behind a tractor 12. Referring also to FIG. 2, the invention is seen to comprise a generally horizontal frame 14 fabricated from steel beams and includes a tongue 16 for attachment to the tractor 12 and two pairs of wheels 20, 22 to support the frame 14 for over-the-road travel as well as to provide depth adjustment capability for the tillage tools carried by the frame 14. As seen in FIG. 1A, the wheels 20, 22 are attached to a wheel arm 24 which is pivotally attached to the frame 14. A hydraulic actuator 26, controlled by the tractor driver, then serves to pivot the wheels 20, 22 with respect to the frame 14, thereby raising and lowering the frame 14 with respect to the ground.

Referring also to FIG. 1B, the invention further includes a toolbar 30 which is pivotally attached to the frame 14 by a plurality of pivot brackets 32. The central pivot brackets 32 further includes a pair of pivot arms 34 connected to a hydraulic actuator 36. As seen in FIG. 1B, as the hydraulic actuator is retracted and extended, the toolbar 30 is pivoted fore and aft, raising and lowering the tillage tools, in this case discs 42, with respect to the frame 14. In conjunction with the wheels 20, 22, the pivoting toolbar 30 allows the tractor driver to selectively control the working depth of the various tillage tools drawn behind the tractor 12.

Figure 3:
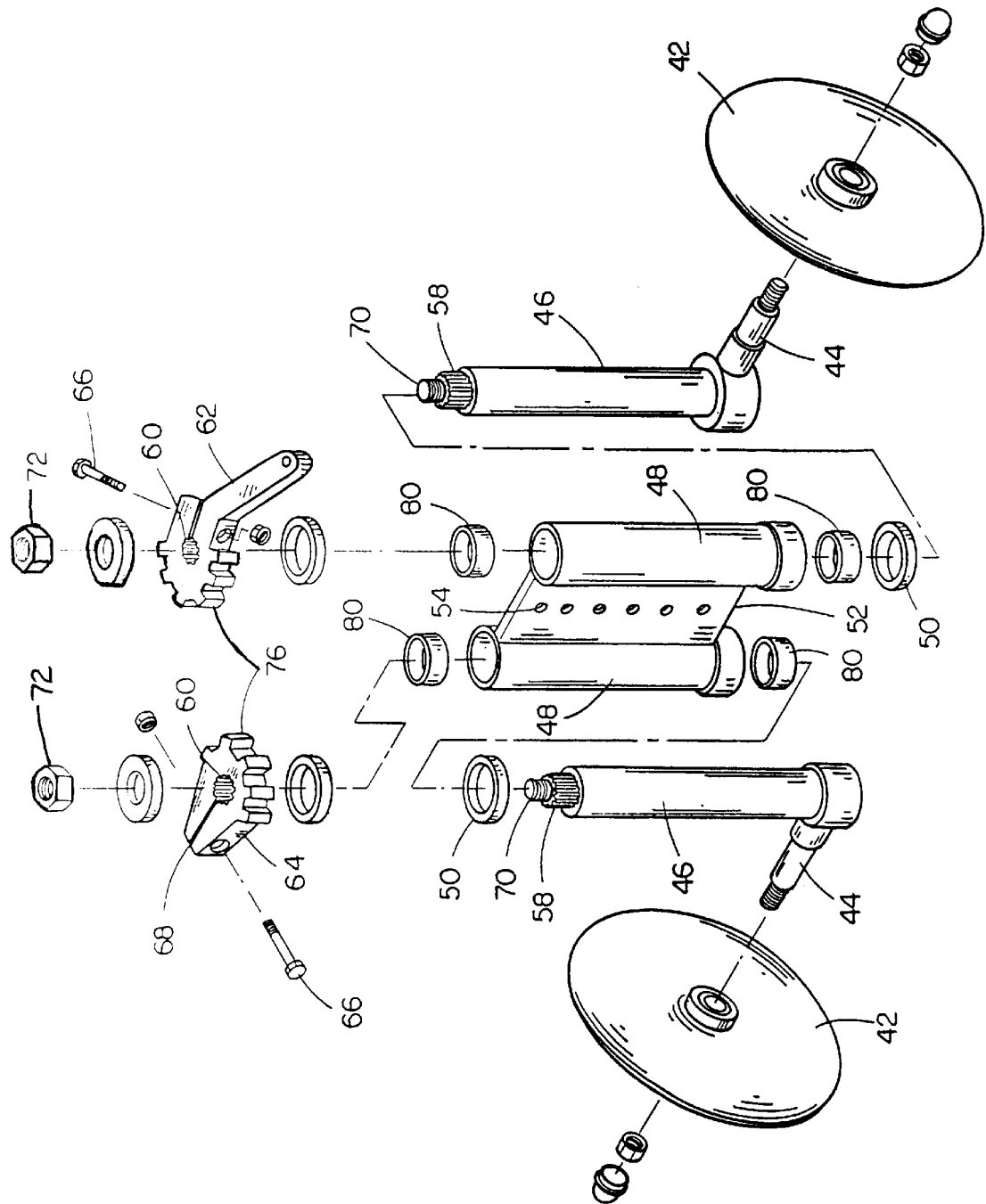
FIG. 3 is an exploded view of the disc assembly of the invention.
Figure 4:
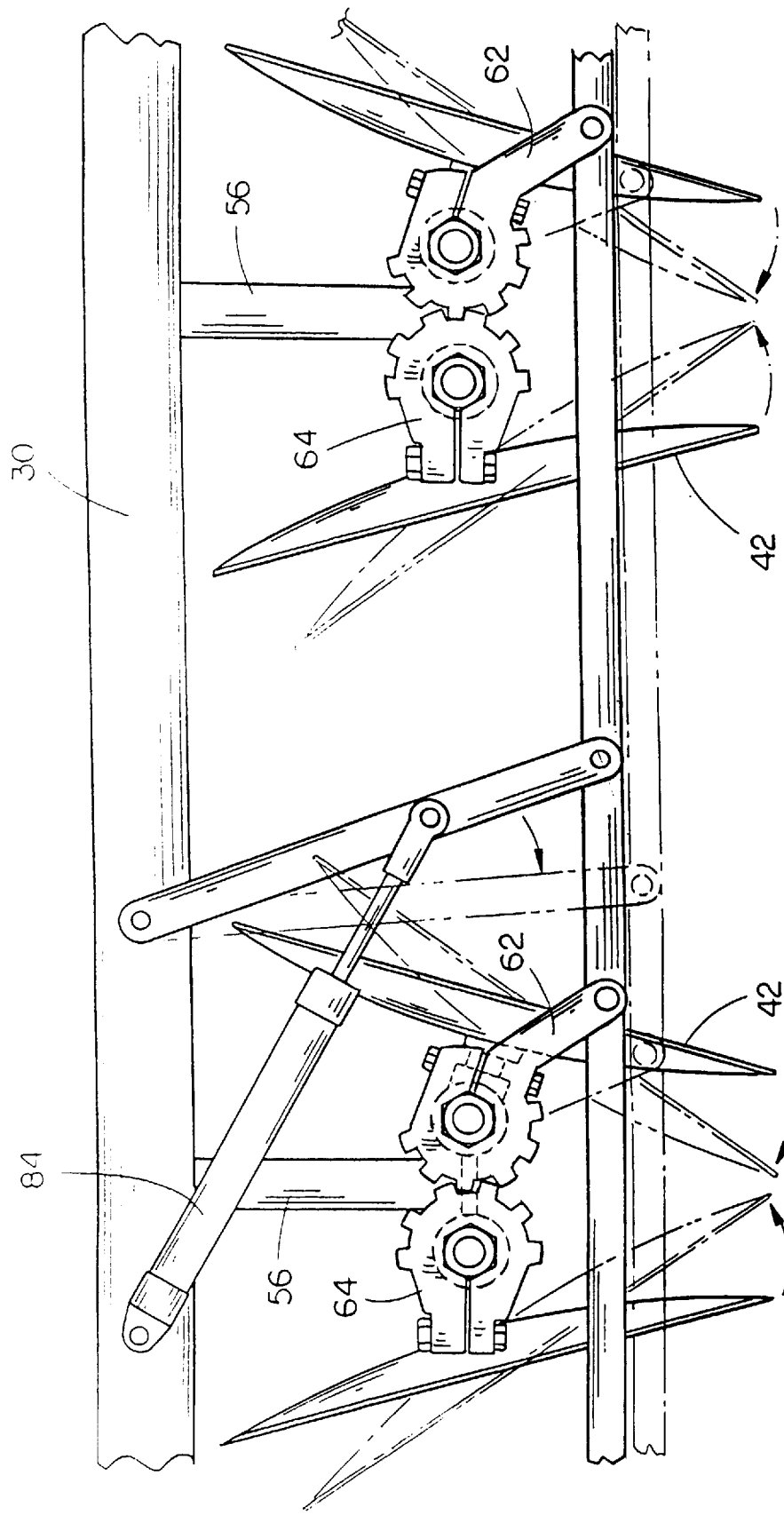
FIG. 4 is a top plan view of two disc assemblies and depicts the angle adjustment mechanism of the invention.

Referring now primarily to FIG. 3, a disc assembly 40 of the invention is shown in exploded view and is seen to comprise a pair of discs 42 which are mounted on axles 44 extending from the lower end of torque shafts 46. The torque shafts 46 are carried within a pair of interconnected sleeves 48 which each carry a pair of bushings 80 and a thrust bearing 50 to reduce friction and wear. The plate 52 connecting the sleeves 48 has a plurality of holes 54 to allow the disc assembly 40 to be bolted to a toolbar extension 56 (FIG. 4). The upper end of the torque shafts 46 has a reduced diameter, toothed section 58 for insertion within toothed apertures 60 in torque arm 62 and torque plate 64. The torque arm 62 and torque plate 64 are securely clamped to the torque shafts 46 by means of bolts 66 tending to close radial slots 68. The torque shafts 46 further include threaded upper ends 70 for receipt of nuts 72.

The torque arm 62 and torque plate 64 each have a geared section 76 for interaction as seen best in FIG. 4. Thus when each torque arm 62 is rotated by the hydraulic actuator 84 through the linkage 82, the torque plate 64 is also rotated, causing the discs 42 to change their angle of attack with respect to the direction of travel of the frame 14.

It should therefore be understood that while the working depth of the various implements may be adjusted by the tractor driver through the use of the hydraulically actuated wheels and the hydraulically pivoted toolbar, so also may the angle of attack of the discs be changed, all while the implements continue to be drawn across a field.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A tillage implement for attachment to a tractor for towing across a field to be tilled, comprising:

(a) a wheeled frame assembly adapted to be towed behind the tractor, said wheeled frame assembly having a longitudinal axis;

(b) a toolbar secured to said wheeled frame assembly, said toolbar being substantially transverse to said longitudinal axis of the tillage implement;

(c) a plurality of disc assemblies operatively fixed to and laterally spaced along said toolbar, each of said plurality of disc assemblies comprising first and second opposing discs, said discs having an angular orientation, and wherein said first and second discs are angularly adjustable relative to one another and to the direction of travel of the tractor; and (d) an actuator, for changing said angular orientation of said first and second discs of each of said plurality of disc assemblies.

2. The tillage implement as recited in claim 1 wherein said toolbar is pivotally secured to said wheeled frame assembly.

3. The tillage implement as recited in claim 2 further comprising first and second torque shafts, each of said torque shafts having an upper end and a lower end, and wherein said first and second discs are rotatably mounted upon first and second axles, said axles extending from said lower ends of said first and second torque shafts, each of said first and second torque shafts extending through and rotatable within first and second bushing sleeves, said first torque shaft having a geared torque arm affixed to said upper end of said first torque shaft, said second torque shaft having a geared torque plate affixed to said upper end of said second torque shaft and in operative engagement with said geared torque arm, said geared torque arm operatively linked to said actuator.

4. The tillage implement as recited in claim 3 and further comprising a linkage interconnecting said geared torque arms of each of said plurality of disc assemblies, said linkage operatively secured to said actuator, whereby actuation of said actuator causes movement of said linkage that in turn causes said geared torque arms connected thereto to rotate that in turn causes rotation of said first and second torque shafts, thus changing said angular orientation of said first and second discs of each of said disc assemblies.

5. The tillage implement of claim 4 wherein said wheeled frame assembly further supports a plurality of deep tillage shanks, each of said shanks being positioned rearwardly and longitudinally in line with one of said plurality of said disc assemblies.

6. A tillage implement with on-the-go angularly adjustable discs adapted to be towed by a tractor, comprising:

(a) a main frame, said main frame having a longitudinal axis;

(b) a ground wheel assembly pivotally attached to said main frame;

(c) a first actuator operatively connected to said ground wheel assembly and said main frame for pivotally raising and lowering said ground wheel assembly with respect to said main frame, thereby raising and lowering said implement with respect to a ground surface;

(d) a toolbar pivotally secured to said wheeled frame assembly, said toolbar being substantially transverse to said longitudinal axis of said main frame of the tillage implement;

(e) a plurality of disc assemblies operatively fixed to and laterally spaced along said toolbar, each of said plurality of disc assemblies comprising first and second opposing discs, said discs having an angular orientation, and wherein said first and second discs are angularly adjustable relative to one another and to the direction of travel of the tractor;

(f) a second actuator operatively connected to said main frame and said toolbar for pivotally raising and lowering said disc assemblies with respect to said main frame; and (g) a third actuator for changing the angular orientation of said first and second discs of each of said plurality of disc assemblies.

7. The tillage implement as recited in claim 6 further comprising first and second torque shafts, each of said torque shafts having an upper end and a lower end, and wherein said first and second discs are rotatably mounted upon first and second axles, said axles extending from said lower ends of said first and second torque shafts, each of said first and second torque shafts extending through and rotatable within first and second bushing sleeves, said first torque shaft having a geared torque arm affixed to said upper end of said first torque shaft, said second torque shaft having a geared torque plate affixed to said upper end of said second torque shaft and in operative engagement with said geared torque arm, said geared torque arm operatively linked to said third actuator.

8. The tillage implement as recited in claim 7 and further comprising a linkage interconnecting said geared torque arms of each of said disc assemblies, said linkage operatively secured to said third actuator, whereby actuation of said third actuator causes movement of said linkage that in turn causes said geared torque arms connected thereto to rotate that in turn causes rotation of said first and second torque shafts, thus changing said angular orientation of said first and second discs of each of said disc assemblies.

9. The tillage implement of claim 8 wherein said main frame further supports a plurality of deep tillage shanks, each of said shanks being positioned rearwardly and longitudinally in line with one of said plurality of said disc assemblies.

10. A tillage implement with on-the-go angularly adjustable discs adapted to be towed by a tractor, comprising:

(a) a wheeled frame assembly adapted to be towed behind the tractor, said wheeled frame assembly having a longitudinal axis;

(b) a toolbar secured to said wheeled frame assembly, said toolbar being substantially transverse to said longitudinal axis of the tillage implement; and (c) a plurality of disc assemblies operatively fixed to and laterally spaced along said toolbar, each of said plurality of disc assemblies comprising first and second opposing discs, said disc assemblies further comprising first and second torque shafts, each of said torque shafts having an upper end and a lower end, and wherein said first and second discs are rotatably mounted upon first and second axles, said axles extending from said lower ends of said first and second torque shafts, each of said first and second torque shafts extending through and rotatable within first and second bushing sleeves, said first torque shaft having a geared torque arm affixed to said upper end of said first torque shaft, said second torque shaft having a geared torque plate affixed to said upper end of said second torque shaft and in operative engagement with said geared torque arm, said geared torque arm operatively linked to an actuator whereby said first and second discs are angularly adjustable relative to one another and to the direction of travel of the tractor.

11. The tillage implement of claim 10 wherein said wheeled frame assembly further supports a plurality of deep tillage shanks, each of said shanks being positioned rearwardly and longitudinally in line with one of said plurality of said disc assemblies.

* * * * *